(12) United States Patent
Büssow

(10) Patent No.: US 8,307,947 B2
(45) Date of Patent: Nov. 13, 2012

(54) DUCT SOUND DAMPER FOR A FLOW MACHINE

(75) Inventor: Richard Büssow, Oberhausen (DE)

(73) Assignee: MAN Diesel & Turbo SE, Augsburg (DE)

(*) Notice: Subject to any disclaimer, the term of this patent is extended or adjusted under 35 U.S.C. 154(b) by 0 days.

(21) Appl. No.: 13/092,422

(22) Filed: Apr. 22, 2011

(65) Prior Publication Data

US 2011/0259667 A1   Oct. 27, 2011

(30) Foreign Application Priority Data

Apr. 22, 2010   (DE) .................. 10 2010 028 089

(51) Int. Cl.
   *E04F 17/04*   (2006.01)

(52) U.S. Cl. .................. 181/224; 181/223; 181/212

(58) Field of Classification Search .................. 181/224, 181/223, 212
See application file for complete search history.

(56) References Cited

U.S. PATENT DOCUMENTS

| | | | | |
|---|---|---|---|---|
| 3,485,267 A * | 12/1969 | Mercer | .................. | 137/599.18 |
| 7,442,121 B2 * | 10/2008 | Cassidy et al. | ................ | 454/306 |
| 7,581,619 B1 * | 9/2009 | Storm | .......................... | 181/225 |
| 7,789,194 B2 * | 9/2010 | Lathrop et al. | ................ | 181/225 |
| 7,929,295 B2 * | 4/2011 | Joshi | .......................... | 361/679.5 |
| 2004/0134712 A1 * | 7/2004 | Lee | .............................. | 181/224 |
| 2005/0161280 A1 * | 7/2005 | Furuya | ......................... | 181/225 |
| 2006/0272886 A1 * | 12/2006 | Mueller | ........................ | 181/224 |
| 2010/0077755 A1 * | 4/2010 | Jangili et al. | .................... | 60/725 |

* cited by examiner

*Primary Examiner* — Forrest M Phillips
(74) *Attorney, Agent, or Firm* — Cozen O'Connor

(57) ABSTRACT

Duct sound damper for deliberate reduction of sound waves for a flow machine, particularly for a compressor, with a housing having at least one horizontally extending acoustically reflective back wall and at least one front cover plate. At least one flow channel connected together through inlet opening and outlet opening is enclosed by at least one damper member reducing the sound. The damper member includes horizontal axial stringers, circumferential stringers, the front cover plate, at least one sound-insulating metal element extending horizontal to the flow-guiding cross section, and the acoustically reflective back wall.

16 Claims, 5 Drawing Sheets

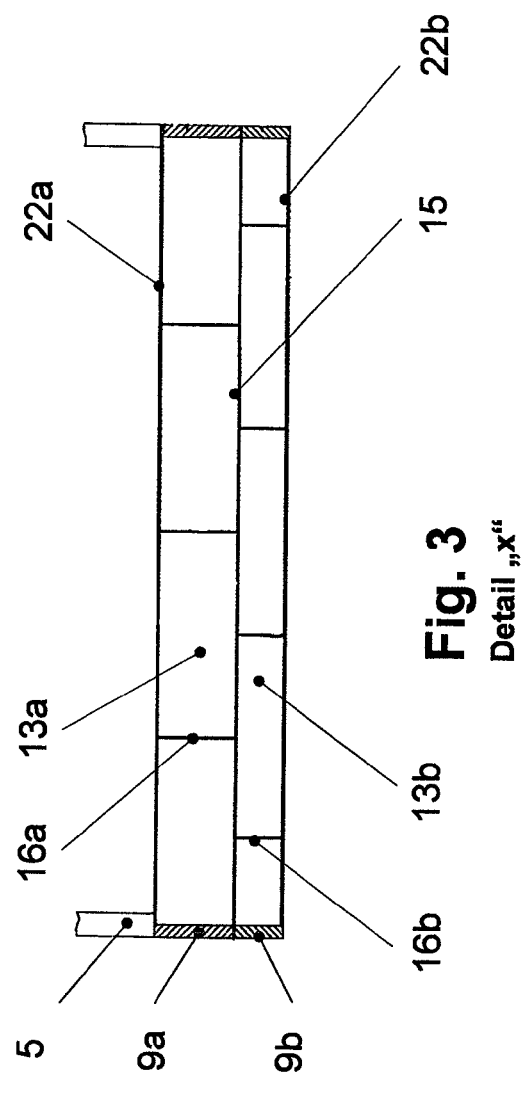
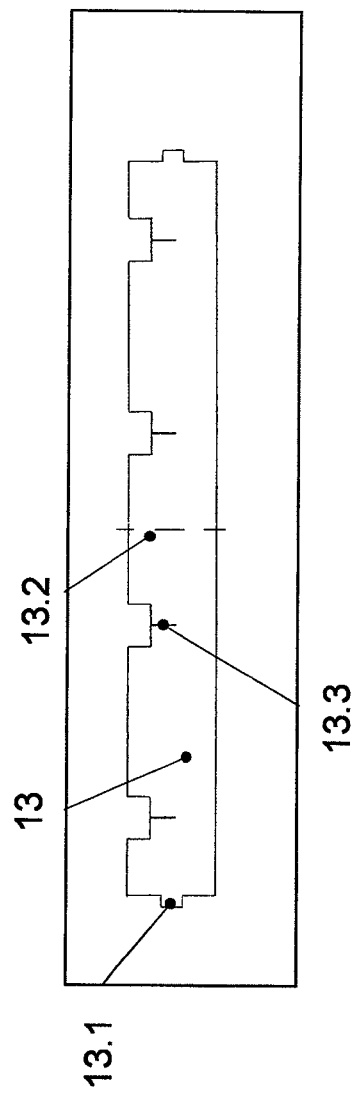

Detail „y"

DUCT SOUND DAMPER FOR A FLOW MACHINE

BACKGROUND OF THE INVENTION

1. Field of the Invention

The invention is directed to a duct sound damper for a flow machine, particularly for a compressor.

2. Description of the Related Art

During the operation of flow machines, there often occur vibrations that are marked, for example, by pressure fluctuations in the fluid, periodic excitations in the machine, or the like, and which result in unwanted acoustic radiation. It is known for purposes of reducing acoustic transmission and emission to arrange duct sound dampers, or inline silencers, upstream and/or downstream of flow machines or stages thereof. The fluid flows through these duct sound dampers to reduce sound propagation.

A duct sound damper is known in which fluid circulates around damper members or splitters received in a housing. These damper members are often made of porous fiber material, for example, glass wool, or the like, and there is a risk of fiber loss so that only limited flow rates are possible, while sufficiently large quieting paths and large cross sections are required.

SUMMARY OF THE INVENTION

It is an object of the present invention to provide an improved duct sound damper for a flow machine, particularly for a compressor, and further to provide a method for installing a duct sound damper of this kind that can be used flexibly and produced for different frequency spectra and which avoids the drawbacks of the prior art.

In one embodiment of the invention there is no fiber material for damping so that higher flow rates are possible and a stand-off distance can be dispensed with resulting in greater freedom in the designing of the ductwork; a slender constructional shape with reduced blocking of the free flow cross section so that there is little or no need for expansions in the duct, and costs can be reduced.

Surprisingly, it has turned out that extensive damping can be achieved in duct sound dampers having a short constructional height through the use of acoustic liners, known per se. For example, these liners comprise chambers and a covering of perforated sheet metal resulting in a Helmholtz resonator effect. When the chambers are covered by sound-insulating metal elements, the Helmholtz resonator effect transitions to a quarter-wave resonator.

In one embodiment, the chambers are formed by thin plates (stringers) that are inserted one inside the other in the interior of the damper members and through the use of a circumferential acoustically reflective back wall resulting in a honeycombed damper member.

One embodiment of the invention is an optimal arrangement of an acoustic liner for the attenuation of sound in a duct.

A duct sound damper according to one embodiment of the invention is provided for a flow machine and is used in a particularly advantageous manner in compressors subject to a strong periodic vibration excitation due to their mechanism of operation. It comprises a flange and a housing for installing in the duct arrangement of the flow machine, acoustically reflective housing walls, one or, preferably more damper members, supporting members in case of a plurality of damper members, axial and circumferential sound-absorbing acoustic liners (stringers), sound-insulating metal elements, acoustically reflective intermediate walls, cover plates, elements for guiding a fluid of the flow machine, for example, a process gas, a liquid, or the like, a central tie rod for detachable fastening of individual duct sound damper elements, and elements for optimal installation in the flow environment.

The duct sound damper is an integral construction and comprises substantially the component parts enumerated above.

In a preferred embodiment of the invention for the construction of only an outer damper member, an acoustically reflective back wall is connected at the front to cover plates. The construction of a honeycombed damper member is carried out by axial and circumferential stringers disposed along the length of the duct sound damper between the acoustically reflective back wall and the sound-insulating metal located at the flow-guiding cross section.

According to another aspect of the invention for the construction of an additional central damper member in combination with an outer damper member, an inner supporting cross is connected to the front, inner cover plates. The damper member is formed by axial and circumferential stringers which communicate on the inner side with the sound-insulating metal along the length of the duct sound damper. The connection of the inner supporting cross to the outer damper member is carried out by the outer cover plates of the latter.

According to another aspect of the invention for the construction of an additional inner damper member in combination with a central damper member and outer damper member, the inner supporting cross is connected to the inner cover plates at the outer circumference. The damper member is formed by axial and circumferential stringers that communicate with the sound-insulating metal on the outer side along the length of the duct sound damper and form the honeycombed inner damper member by means of another, outer sound-insulating metal. The inner and outer supporting crosses, which are required in this case, are connected to the inner damper member by the cover plates of the outer and central damper member. In a preferred embodiment form, the damper member is constructed in a double-sided manner so that an acoustically reflective back wall is again provided between the inner and outer circumferential sound-insulating metal, and the arrangement of the axial and circumferential stringers which are separated by the acoustically reflective back wall and of the sound-insulating metal is also accordingly carried out in a doubled manner.

The sound-insulating metal and the axial and circumferential stringers are preferably plate-shaped, have a small thickness, approximately 0.5-1.5 mm, and are held together by one or more snap-in connections and fixed connections.

In order to produce duct sound dampers in a variety of different lengths and for a variety of needs in an economical manner, longer duct sound dampers preferably comprise assembled and ready-made duct sound damper elements. These individual elements are connected by pins in the supporting crosses and centrally by a tie rod arranged in the middle of the central damper member.

The central and middle damper members are covered by incident-flow caps, which is advantageous with respect to fluidics and protects the interior of the damper member.

With regard to the choice of material for the sound-insulating metal and for the axial and circumferential stringers, different environmental requirements and sound-conducting characteristics can be specially taken into account and predetermined for given frequency ranges.

For very small duct sound dampers, it is conceivable to dispense with the central and middle damper member and, accordingly, to provide only the annular outer damper member. One or more supporting crosses are then provided only in case of static necessity.

For duct sound dampers with smaller or medium diameters, it is conceivable that the middle damper member is dispensed with and, accordingly, only a central damper member and an annular outer damper member are provided.

For duct sound dampers with larger diameters, it is conceivable to provide two or more middle damper members in addition to the central and outer damper members.

In order to facilitate the installation of the duct sound damper and ensure the installation in non-round flow cross sections of the inlet lines and outlet lines of the flow machine, it is possible to provide compensation plates at the circumference of the duct sound damper and/or spherical rollers at the end of a duct sound damper element.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be described with reference to the drawings. The drawings show:

FIG. 3 is a side view of a section X of FIG. 2 of the duct sound damper according to an embodiment of the present invention, in longitudinal section;

FIG. 4 is a side view of an axial stringer according to an embodiment of the present invention;

DETAILED DESCRIPTION OF THE PRESENTLY PREFERRED EMBODIMENTS

Figure 1:
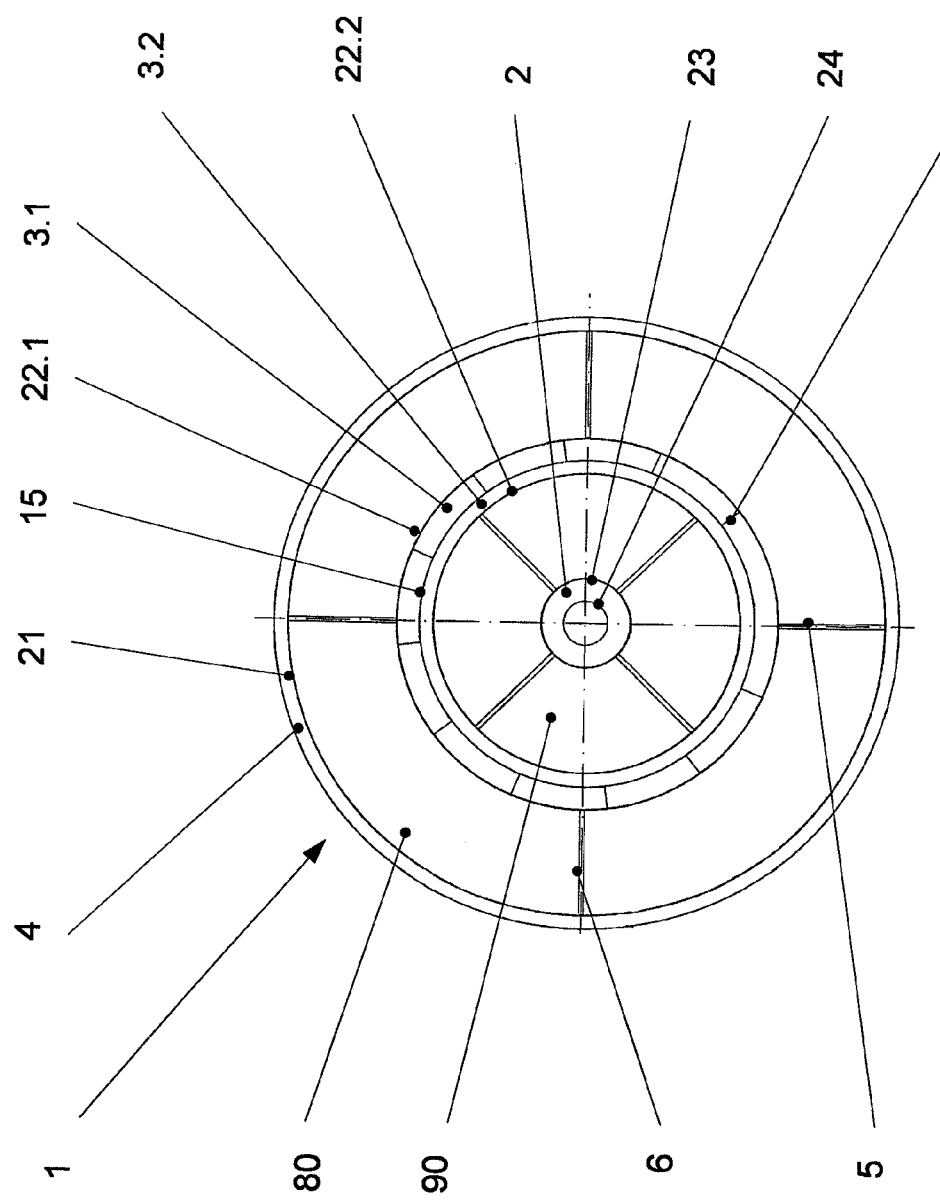
FIG. 1 is a front view of a duct sound damper according to an embodiment of the present invention, in longitudinal section.

A duct sound damper according to an embodiment example of the present invention will be described with reference to the accompanying drawings.

FIGS. 1 to 6 show the duct sound damper (1) in its entirety and associated elements for constructing the damper members (2; 3; 4). The duct sound damper (1) is inserted into a flow duct, designated by reference numeral 100, and detachably connected thereto by flanges (101).

Figure 2:
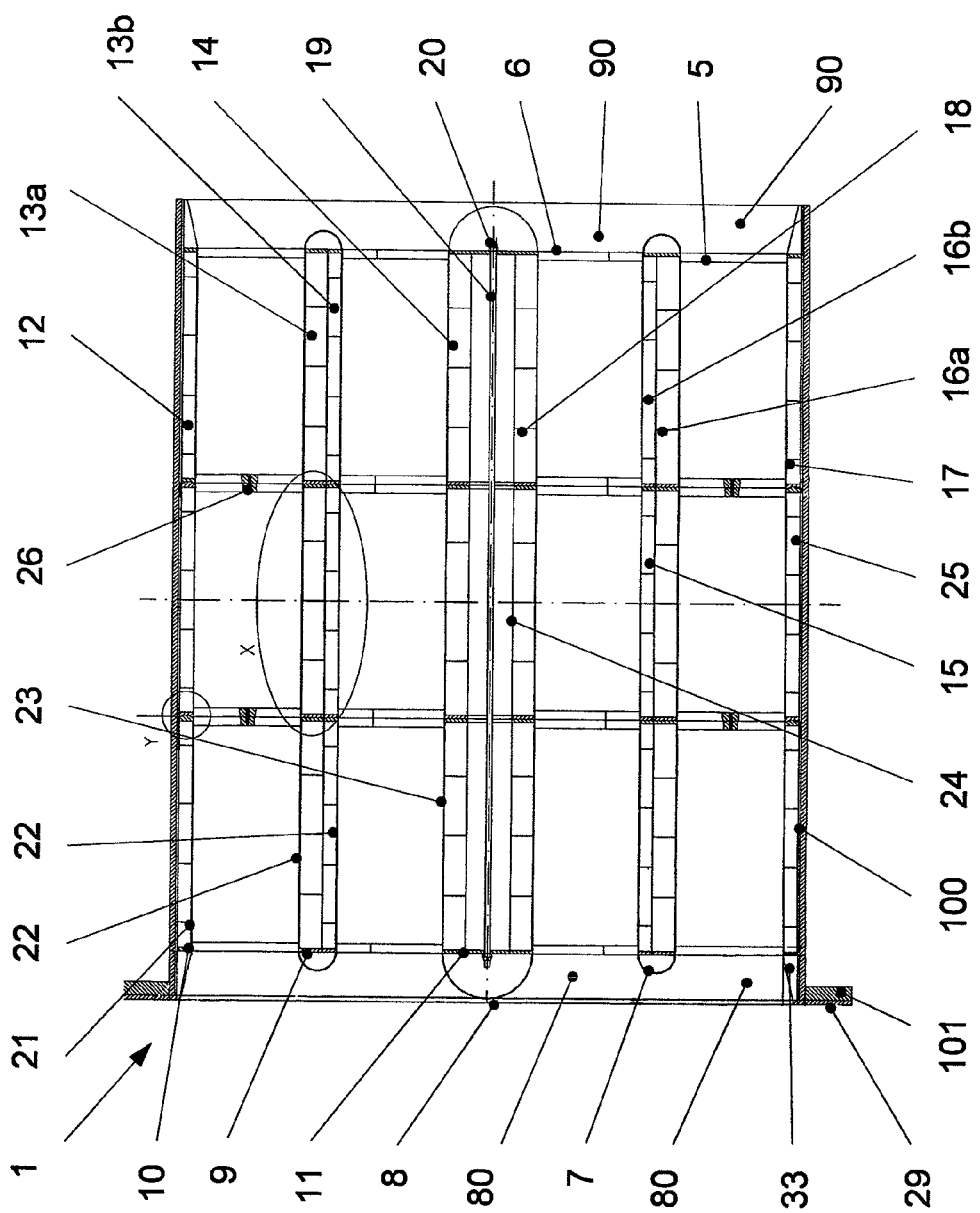
FIG. 2 is a side view of a duct sound damper according to an embodiment of the present invention, in longitudinal section.

In the embodiment example of the present invention, the duct sound damper (1) comprises three main elements. These main elements are detachably connected to one another along the length by pins (21) and a central tie rod (19). (FIG. 2).

As regards their basic construction, all of the duct sound damper elements are identical and are adapted to the particular installation situation only when assembled.

A duct sound damper element substantially comprises a central damper member, inner damper member, and outer damper member (2; 3; 4), each of which is connected to the inner and outer supporting crosses (5; 6) by their central cover plate, inner cover plate and outer cover plate (9; 10; 11). (FIG. 2).

Figure 6:
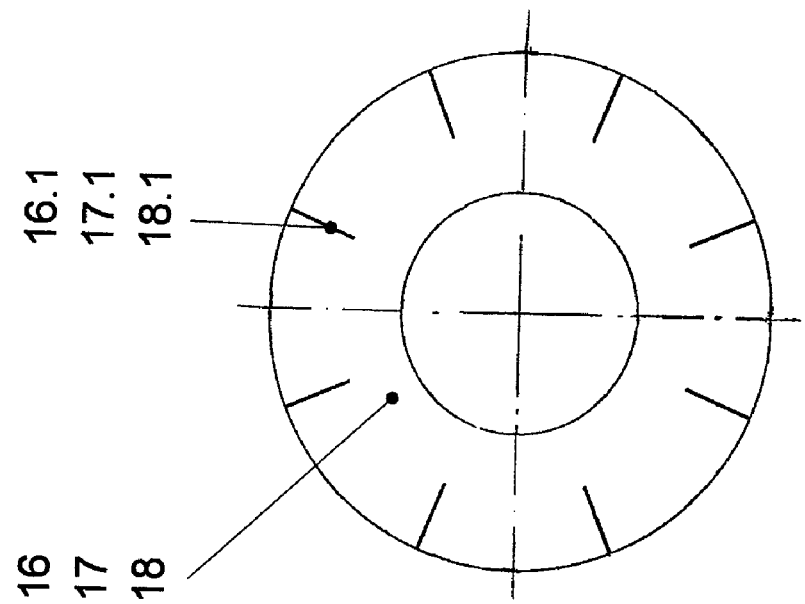
FIG. 6 is a front view of a circumferential stringer according to an embodiment of the present invention.

The central damper member (2) is arranged annularly centrally in the duct sound damper (1) and is enclosed by an acoustically reflective back wall (24) toward the circumferential side in which flow is absent. This acoustically reflective back wall (24) is connected to the central cover plate (11). The damper member (2) is limited by the central sound-insulating metal (23) toward the free flow cross section. The damper member (2) is formed by central axial stringers (14) that extend along the circumference every 30° over the entire length of the duct sound damper, central circumferential stringers (18), and central cover plates (11) which are arranged at the front side; these are connected to one another by inserting one inside the other. The central cover plates (11) contain slot-like recesses (11.1) on the front, projections (13.1) on the end of the central axial stringers (13) engaging therein so as to be fixed axially. Apart from the end-side projections (13.1), the central axial stringers (13) also have projections (13.2) and slots (13.3) distributed along their length. In this regard, the projections (13.2) contact the central sound-insulating metal (23), and the slots (13.2) serve as engagement points for the central circumferential stringers (18) (FIGS. 1, 4). The central circumferential stringers (18) likewise have slots (18.1) for engaging in the central axial stringers (14). (FIG. 6).

The inner damper member (3) is arranged annularly in the interior of the duct sound damper (1) and is enclosed by an acoustically reflective back wall (24) toward the circumferential side in which flow is absent, this acoustically reflective back wall (24) being connected to the inner cover plate (9). The damper member (3) is limited by inner sound-insulating metal elements (22a; 22b) at both free flow cross sections. (FIG. 3). The damper member (3) is formed by inner axial stringers (13a; 13b) which extend along the circumference every 30° over the entire length of the duct sound damper element, inner circumferential stringers (16a; 16b), and inner cover plates (9a, 9b) which are arranged at the front side. In contrast to the central damper member (2), the annular damper member (3) is divided along the circumference by an inner acoustically reflective back wall (15). As with the central damper member (2), inner axial stringers (13), inner circumferential stringers (16) and inner cover plates (9) are inserted one inside the other. The inner cover plates (9) contain slot-like recesses (9.1) on the front, projections on the end of the inner axial stringers (13a; 13b) engaging therein so as to be fixed axially. Apart from the end-side projections (13.1), the inner axial stringers (13a; 13b) also have projections (13.2) and slots (13.3) distributed along their length. The projections (13.2) contact the inner sound-insulating metal (22a; 22b), and the slots (13.3) serve as engagement points for the inner circumferential stringers (16a; 16b). The inner circumferential stringers (16a; 16b) likewise have slots (16.1) for engaging in the inner axial stringers (13a; 13b). (FIG. 3).

Figure 5:
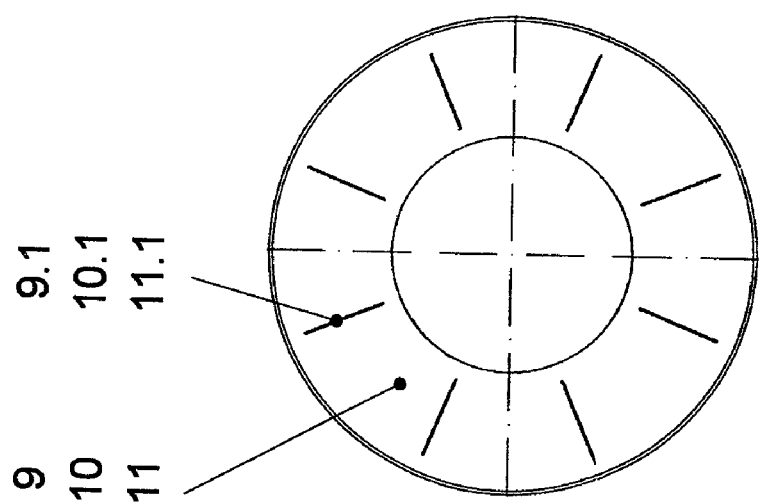
FIG. 5 is a front view of a cover plate according to an embodiment of the present invention.

The outer damper member (4) is arranged annularly on the outer side of the duct sound damper (1) and is enclosed by an acoustically reflective back wall (25) toward the circumferential side in which flow is absent, this acoustically reflective back wall (25) being connected to the outer cover plate (10). (FIG. 1) The damper member (4) is limited by outer sound-insulating metal (21) at the free flow cross section. The damper member (4) is formed by outer axial stringers (12) that extend along the circumference every 30° over the entire length of the duct sound damper, outer circumferential stringers (17), and outer cover plates (10) which are arranged at the front side and are connected by insertion one inside the other. The outer cover plates (10) contain slot-like recesses (10.1) on the front, projections on the end of the central axial stringers (12) engaging therein so as to be fixed axially. (FIG. 5). Apart from the end-side projections, the central axial stringers (12) also have projections and slots distributed along their length. The projections contact the outer sound-insulating metal (23), and the slots serve as engagement points for the outer circumferential stringers (17). (FIGS. 4, 6) The outer circumferential stringers (17) likewise have slots (17.1) for engaging in the outer axial stringers (14).

When the duct sound damper (1) is formed, for example, of three duct sound damper elements, they are secured to one another initially by pins (29) and then fixedly connected to one another by a central tie rod (19). This tie rod (19) is located in the interior of the central damper member, has stop points at the central cover plates (11) and connects the duct sound damper elements to one another by tightening crown nuts (20).

The central and inner damper members (2; 3) are covered by incident-flow caps (7; 8); this has fluidic benefits and protects the inner damper members (2; 3) against damage. (FIG. 2).

For installing the duct sound damper (1) in a flow duct (100) which is mounted downstream or upstream of the flow machine, a flange (29) is provided at one end of the duct sound damper (1) for arranging at a flange (101) of the flow duct (100). The flange (29) is connected to the annular outer cover plate (10) by gusset plates (33).

Figure 7:
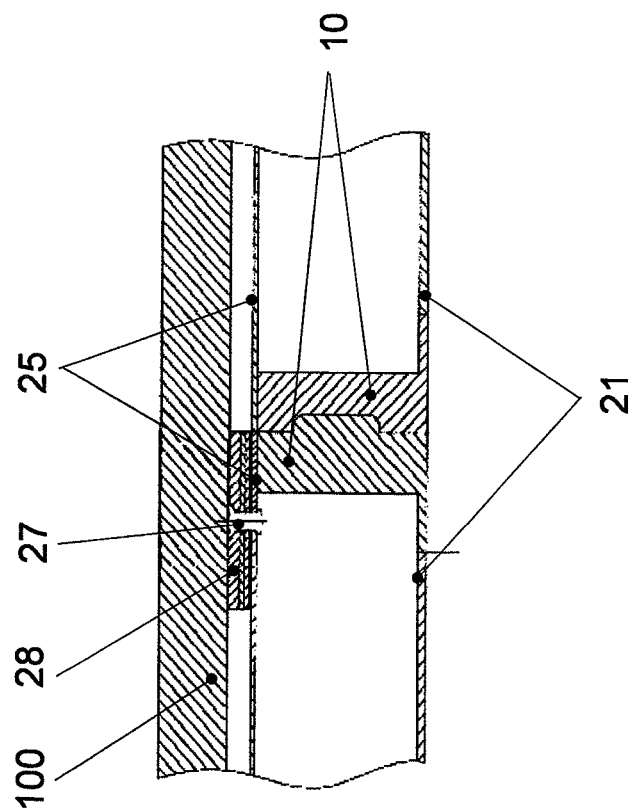
FIG. 7 is a side view of a section y of FIG. 2 for arranging the compensation plates according to an embodiment of the present invention, in longitudinal section.

As can be seen from FIG. 7, compensation plates (28) are arranged at the outer circumference of the acoustically reflective back wall (25) so as to be distributed along the outer circumference of the duct sound damper (1) by blind rivets (27) for optimal orientation of the duct sound damper (1) in the flow duct (100). The quantity of compensation plates (28) can differ depending on the roundness of the flow duct (100).

Figure 8:
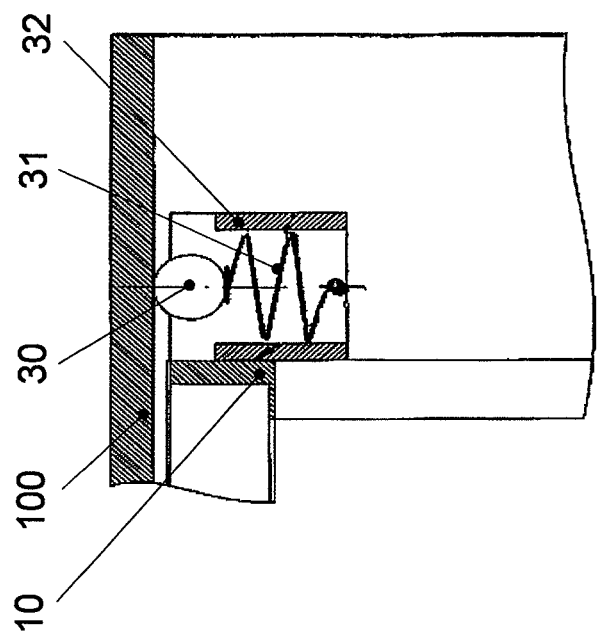
FIG. 8 is a side view of a section for the arrangement of the spherical roller according to an embodiment of the present invention, in longitudinal section.

FIG. 8 shows how an optimized installation of the duct sound damper (1) in the flow duct (100) is achieved in that a spherical roller (30) with a spring element (21) is additionally provided in a sleeve so as to be distributed over the outer circumference toward the end of a duct sound damper element. The duct sound damper element is supported by the spring element which is preloaded vertically in direction of the wall of the flow duct (100). In addition, there is also a decoupling of the vibrations so as to impede their transmission and so that the sound damping is positively affected.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A duct sound damper for deliberate reduction of sound waves for a flow machine, particularly for a compressor, comprising:
    a housing comprising at least one horizontally extending acoustically reflective back wall;
    at least one front cover plate; at least one flow channel connected together through an inlet opening and an outlet opening enclosed by at least one damper member reducing the sound, the damper member comprising:
    first horizontal axial stringers;
    first circumferential stringers whose major dimension extends horizontal to the flow guiding cross section:
    the front cover plate;
    at least one sound-insulating metal element extending horizontal to the flow-guiding cross section; and the acoustically reflective back wall.

2. The duct sound damper according to claim 1, wherein the sound-insulating metal element is perforated sheet metal.

3. The duct sound damper according to claim 1, wherein the axial stringers, the circumferential stringers, and the cover plate are connected to one another by snap-in connections.

4. The duct sound damper according to claim 2, wherein the axial stringers, the circumferential stringers, and the cover plate are inserted one inside the other by projections and slots.

5. The duct sound damper according to claim 1, further comprising an outer damper member.

6. The duct sound damper according to claim 1, further comprising an outer damper member and a middle damper member.

7. The duct sound damper according to claim 5, wherein the outer damper member and middle damper member are fixedly connected to a supporting cross at least at one of the inlet end and outlet end.

8. The duct sound damper according to claim 1, further comprising an outer damper member, a middle damper member, and a central damper member.

9. The duct sound damper according to claim 7, wherein the outer damper member, the middle damper member, and the central damper member are fixedly connected to the supporting cross at least at the inlet end and outlet end.

10. The duct sound damper according to claim 7, wherein the supporting crosses are fixedly connected to the sound-insulating metal element.

11. The duct sound damper according to claim 1, wherein the damper member is constructed in a doubled manner, second axial stringers and second circumferential stringers separated by an acoustically reflective back wall form a second, parallel damper member.

12. The duct sound damper according to claim 1, wherein the acoustically
    reflective back wall is fixedly connected to the cover plates.

13. A method for the installation of the duct sound damper according to claim 1 in a flow duct of a flow machine comprising:
    Arranging at least one compensation plate at the outer circumference of the acoustically reflective back wall; and compensating for a non-round flow duct.

14. The method for the installation of a duct sound-damper in a flow duct of a flow machine according to claim 13, further comprising arranging at least one spherical roller under spring force circumferentially at the flow end of a duct sound damper element at the acoustically reflective back wall to support the duct sound damper in the flow duct.

15. The method for the installation of a duct sound-damper in a flow duct of a flow machine according to claim 14, wherein the spring force acts substantially vertically in direction of the inner wall of the flow duct.

16. The duct sound damper according to claim 1, further comprising at least one spherical roller under spring force is arranged circumferentially at the flow end of a duct sound damper element at the acoustically reflective back wall thereof to support the duct sound damper in the flow duct.

\* \* \* \* \*